United States Patent

[11] 3,623,546

[72] Inventors: Clifford R. Banthin, Redding; Dennis F. Sharp, Shelton; Ernest M. Mihalyak, West Haven, all of Conn.
[21] Appl. No.: 875,145
[22] Filed: Nov. 10, 1969
[45] Patented: Nov. 30, 1971
[73] Assignee: Avco Corporation, Stratford, Conn.

[54] COOLING SYSTEM FOR AN ELECTRONIC ASSEMBLY MOUNTED ON A GAS TURBINE ENGINE
5 Claims, 1 Drawing Fig.

[52] U.S. Cl. .................................................. 165/51, 60/39.66, 123/41.31, 165/106, 174/15, 174/16, 317/100
[51] Int. Cl. .................................................. F02b 11/02
[50] Field of Search .................................. 165/47, 80, 51, 104–107; 317/100; 174/15, 16; 60/39.66; 123/41.42, 41.31

[56] References Cited

UNITED STATES PATENTS

| | | | |
|---|---|---|---|
| 2,445,582 | 7/1948 | Melville | 317/100 X |
| 2,917,903 | 12/1959 | Stineman et al. | 62/55 |
| 2,970,437 | 2/1961 | Anderson | 60/39.66 |
| 3,011,313 | 12/1961 | Horton | 60/39.66 |
| 3,141,999 | 7/1964 | Schneider | 317/100 |
| 3,243,672 | 3/1966 | Simonds et al. | 174/15 X |
| 3,270,250 | 8/1966 | Davis | 317/100 |
| 3,356,903 | 12/1967 | Arnold | 317/100 |
| 3,421,825 | 1/1969 | Maycock | 123/41.42 X |

FOREIGN PATENTS

| | | | |
|---|---|---|---|
| 489,052 | 12/1952 | Canada | 60/39.66 |

OTHER REFERENCES

Roth, G. L. et al., "How To Use Fuel As A Heat Sink," Space/Aeronautics, March, 1960, pp. 56 to 60, TL501.A83

Primary Examiner—Albert W. Davis, Jr.
Attorneys—Charles M. Hogan and Irwin P. Garfinkle

ABSTRACT: The illustrated embodiment shows a cooling system for electronic equipment mounted on a gas turbine engine. The system combines air, engine fuel, and a thermally conductive electrically dielectric fluid to provide cooling under extreme heat environments. Electronic equipment is placed in a thermally conductive fluid within an annular container which is horse-collared on a fuel line. The container is double walled and coolant air is directed through the space between the walls. Thus cooling results from coolant air and engine fuel, and is made more efficient by the fluid.

PATENTED NOV 30 1971
3,623,546
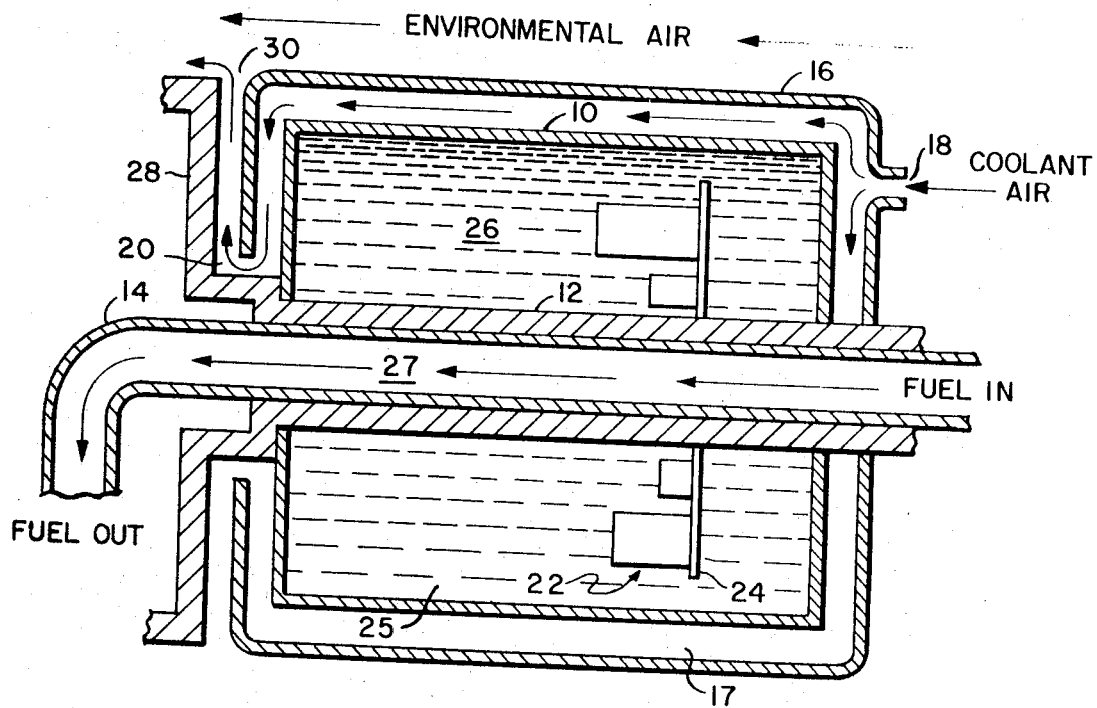
INVENTORS.
CLIFFORD R. BANTHIN
DENNIS F. SHARP
ERNEST M. MIHALYAK
BY Charles M. Hogan
Irvin P. Campbell
ATTORNEYS.

COOLING SYSTEM FOR AN ELECTRONIC ASSEMBLY MOUNTED ON A GAS TURBINE ENGINE

This invention was made in the course of a contract with the United States Government, Department of Army.

BACKGROUND OF THE INVENTION

Modern gas turbine engines now require sophisticated electronic circuits for providing the many, various controls. For example, modern fuel control systems utilize complex computers made up of high-density integrated circuits. Because they generate large quantities of heat in very small areas and also because they are physically located within the high-temperature environment of a gas turbine engine such circuits must be cooled efficiently. It is not unusual for computers for fuel control systems to be positioned in environments of from −65° to +300° F. Obviously, electronic components, especially semiconductor devices, are generally limited to operating temperatures considerably below 300° F., and operation above the prescribed limits can cause permanent damage, causing failures or changes in the operating characteristics.

SUMMARY OF THE INVENTION

This invention provides a novel cooling arrangement using air, engine fuel, and a thermally conductive fluid which in combination provide the required cooling for the electronic devices. The electronic components are conventionally mounted in a sealed casing through which the gas turbine fuel line extends. The casing is filled with a thermally conductive, electrically dielectric fluid. The casing is enclosed by a jacket, the space between the casing and the jacket providing an annular passage for coolant air flow. Thus, cooling for the electronic components within the casing is provided by several factors: (1) the spaced jacket surrounding the casing provides insulation from the high-temperature environment of the gas turbine engine; (2) the coolant air flowing through the space between the casing and the jacket removes heat from the casing; (3) the thermally conductive fluid removes heat generated by the electronic components and delivers the heat to the casing and the fuel line; and (4) heat at the fuel line is dissipated by the fuel flow through the fuel line.

THE DRAWING

The single FIGURE shows a cross-sectional view of an exemplary embodiment of this invention.

DESCRIPTION OF THE DISCLOSED EMBODIMENT

The cooling system shown in the drawing consists of a light sheet metal annular casing 10, having an inner sleeve 12 fitted onto a fuel line 14. The casing 10 is provided with a spaced jacket 16 to provide a double-wall construction serving to insulate the interior of the casing 10 from the high-temperature environmental air and to provide a passageway 17 for coolant air. Coolant air is admitted to the passageway 17 through an entry port 18. The coolant air, after removing heat generated from within the casing 10, exits at a port 20.

The electronic components 22 which are to be cooled are mounted on an annular mounting disk 24 fitted onto the metallic sleeve 12. The entire remaining volume within the chamber 25 defined by the casing 10 and the sleeve 12 is filled with a thermally conductive, electrically dielectric fluid 26.

In modern gas turbine engines the control circuits often require computers made with high-density, heat-generating microelectronic components. At present, the microelectronic circuits are made up of semiconductor chip elements which are individually packaged in hermetically sealed enclosures to protect them from environmental conditions and handling damage. These enclosures represented a substantial part of the cost, size and weight of the assemblies. By wiring the unsealed chip elements to mounting disks made of alumina silica substrates or other satisfactory materials and by immersing these unsealed assemblies in the dielectric fluid, for example, silica, the assemblies are both protected and are provided with an efficient heat transferring medium.

The thermally conductive, electrically dielectric fluid 26 serves to transfer the heat generated by the electronic components 22 to the sleeve 12 and the casing 10. The heat in the casing 10 is removed by the coolant air flow through the passageway 17. The heat from the sleeve 12 is removed by conduction to the fuel line 14 from where it is removed by convection transfer to the fuel 27 flowing through the line. The greater the fuel flow, the greater is its cooling effect.

The sleeve 12, which provides the mating surface between the mounting for the electronics 22 and the fuel line 14, is flanged at 28 to provide a discharge passage 30 for the exhaust air from the passageway 17. Since this exhaust air discharged over the flange 28 of the sleeve 12, the metal temperature of the mating sleeve 12 is lowered and thus serves to reduce the conductive heat transfer into the electronic system 22.

Since the required coolant air flow pressure drop is in the order of 0.1 pounds per second, the air may be tapped from the engine's first stage compressor rotor. Alternatively this air may be induced into the cooling chamber by utilizing the reduced pressure in the engine inlet housing.

The advantages obtained by immersing the uninsulated electrical components in a dielectric fluid are several. First, the low thermal resistance of the direct fluid contact allows excellent thermal transfer to occur between the devices and the air and fuel cooled surfaces of the container. Second, the fluid's thermal conductance properties eliminate localized hot spots in the package to produce a more even ambient temperature throughout. Third, detrimental effects caused by vibration are minimized by the damping effect of the fluid environment. Fourth, economic benefits are obtained by eliminating the individually hermetically sealed enclosures used to protect the semiconductor chips. Fifth, assembly, test and chip replacement in manufacturing and servicing are expedited because the chip elements are accessible. Sixth, the thermally conductive fluid requires no circulating pumps or large mechanical heat sinks.

The cooling system as shown is capable of maintaining steady state temperatures of electronic equipment below their limiting values even for extreme conditions of minimum fuel flow and very high-temperature environmental air as well as high power consumption within the electronics itself.

In summary, the system incorporates several cooling factors which cooperate to produce highest efficiency: (1) the double wall construction provides insulation of the electronic equipment from the environmental air; (2) heat generated by the electronic equipment is removed from the immediate vicinity of the electronic equipment by means of an electrically dielectric, thermally conductive fluid; (3) the heat removed from the electronic equipment by the fluid is transferred into the casing and the mating sleeve; (4) coolant air serves to remove the heat from the casing; (5) the fuel flowing through the fuel line on which the system is mounted serves to cool the mating sleeve; and (6) the mating sleeve is cooled from environmental air by means of the coolant air which is provided with a passageway over the mating sleeve.

We claim:

1. In a cooling system for an electronic circuit mounted in the environment of an engine supplied with a relatively cool fluid fuel through a fuel line, the combination comprising:

a fuel line;

a supply of relatively cool fuel flowing through said fuel line;

an insulating base;

an electronic circuit mounted on said base;

a sealed, thermally conductive casing, said base and said circuit being positioned within said casing;

a source of coolant air;

a jacket spaced from said casing to provide a double wall, the space between said casing and said jacket providing an axial passage for said coolant air;

an electrically dielectric, thermally conductive fluid filling said casing and immersing said circuit; and said fuel line extending through said base and said electronic circuit.

2. The invention as defined in claim 1 wherein said casing is provided with a centrally positioned sleeve longitudinally extending the length of said casing, said fuel line extending through said sleeve and supporting said casing, said sleeve extending through and supporting said insulating base.

3. The invention as defined in claim 2 wherein said sleeve is extended axially beyond said container and radially outwardly to form in combination with the outer jacket a radial coolant passageway.

4. The invention as defined in claim 1 wherein the cross section of said casing is an annulus having an inner diameter wall and an outer diameter wall, and wherein said fuel line is positioned on the axis of said casing in contact with said inner diameter wall.

5. The invention as defined in claim 4 wherein said base is supported on the inner circumference of said annular casing.

* * * * *